United States Patent [19]
Cheng

[11] Patent Number: 5,815,284
[45] Date of Patent: Sep. 29, 1998

[54] SCANNER INTERFACE DEVICE OF VIDEO SYSTEM

[75] Inventor: Andy Cheng, Hsin-Chu, Taiwan

[73] Assignee: Must Systems Inc., Hsin-Chu, Taiwan

[21] Appl. No.: 435,666

[22] Filed: May 5, 1995

[51] Int. Cl.⁶ .................. H04N 1/00; H04N 1/32; H04N 1/40; H04N 1/04
[52] U.S. Cl. .......... 358/400; 358/442; 358/471; 358/479; 345/154
[58] Field of Search ............... 358/442, 468, 358/471, 473, 498, 400, 479; 348/446; 345/52, 154; 379/100.01, 90.01, 93.01, 442, 88

[56] References Cited

U.S. PATENT DOCUMENTS

| | | | |
|---|---|---|---|
| 4,688,108 | 8/1987 | Cotton et al. | 358/261.1 |
| 4,819,101 | 4/1989 | Lemelson | 358/335 |
| 4,897,735 | 1/1990 | Oneda | 358/449 |
| 4,907,280 | 3/1990 | Barney et al. | 358/512 |
| 4,933,765 | 6/1990 | Schiff et al. | 348/474 |
| 4,989,237 | 1/1991 | Kotani et al. | 358/473 |
| 5,465,165 | 11/1995 | Tanio et al. | 358/448 |
| 5,499,113 | 3/1996 | Tsuboi et al. | 358/479 |
| 5,502,727 | 3/1996 | Catanzaro et al. | 370/94.2 |
| 5,515,181 | 5/1996 | Iyoda et al. | 358/474 |

*Primary Examiner*—Kim Yen Vu
*Assistant Examiner*—Kimberly A. Williams

[57] ABSTRACT

A scanner interface device of video system used with a scanner scanning a scanned object to obtain a scanned signal includes a scanner interface receiving the scanned signal outputted by the scanner and transforming the scanned signal into a preliminary video signal, a converter electrically connected to the scanner interface for transforming the preliminary video signal into a secondary video signal complying with a specific video system format, and a control unit electrically connected to the scanner interface and the converter for controlling the scanner interface device. The present invention is easy to operate and appropriate for use in families, can be used more diversely, and stores more data with less expense.

14 Claims, 1 Drawing Sheet

SCANNER INTERFACE DEVICE OF VIDEO SYSTEM

FIELD OF THE INVENTION

The present invention is related to a scanner interface, and more particularly to a scanner interface device of video system.

BACKGROUND OF THE INVENTION

Although in recent years, the technique of the scanner has been sophisticatedly developed which introduces amazing visual effects to the computer monitor and its price has been economically acceptable, the use of scanners is still limited to places like offices or academic institutions where people have received professional training or own the knowledge required to use a computer, and never becomes popular among those who do not know how to work with a computer. The reason for that is because a scanner always has to cope with a personal computer, that is, a user has to connect a scanner to a personal computer to have the scanned data shown on a monitor or stored in a disk, or if the data need to be edited or taken for any further modifications, one will have to give instructions to the computer which is a barrier for people who are not skilled in this field. Consequently, it is difficult for a scanner to become as popular as a TV, VCR, or family electric appliance of the like.

Additionally, attributing to the fact that most of the data a scanner scans are graphic data which require a huge amount of memory for storage and the scanned graphic data are stored in disks, the storage of these data is rather expensive.

SUMMARY OF THE INVENTION

An object of the present invention is to provide a scanner interface device of video system so as to present the data scanned by a scanner in various types of video systems for expanding the application area of the scanner.

Another object of the present invention is to provide a scanner interface device of video system in order to simplify the operation procedure of the scanner for the users.

Another further object of the present invention is to provide a scanner interface device of video system to store more scanned data with less expense.

In accordance with the present invention, the present scanner interface device of video system used with a scanner may include a scanner interface receiving the scanned signal outputted by the scanner and transforming the scanned signal into a preliminary video signal, a converter electrically connected to the scanner interface for transforming the preliminary video signal into a secondary video signal complying with a specific video system format, and a control unit electrically connected to the scanner interface and the converter for controlling the scanner interface device.

The present scanner interface device can further include a scanner-matching interface electrically connected to the scanner to secure an electrical match between the scanner interface of video system and the scanner.

The converter can be a video mixed signal generator.

The control unit may include a central control device electrically connected to scanner interface and converter to control converter, a control instruction inputting device which is electrically connected to the central control device through which a user can use a variety of control instructions to control the scanner interface, and a storage memory device electrically connected to the central control device for storing therein a variety of programming instructions that the central control device needs.

The central control device can be a central process unit (C.P.U.).

The present scanner interface device may further include an audio signal generator which is electrically connected to the control unit for producing a simulated audio signal. A power supply device can also be included to provide a required working power for the scanner interface device of video system.

The video system format can be selected from a group consisting of NTSC (National Television System Comnmittee), SELAM (Sequence And Memory), PAL (Phase Alternation Line), and HDTV (High Difinite TV).

The scanner-matching interface can be one used for a hand-held scanner when the scanner is of a hand-held type.

The scanner-matching interface also can be one used for a sheet-feed scanner when the scanner is of a sheet-feed type.

The storage memory device can be selected from one of ROM and RAM.

The secondary video signal can be shown on a video system.

The video system can be selected from a group consisting of a personal computer, a television, and a VCR.

The secondary video signal can be stored in a video data storing medium.

The video data storage medium can be selected from a group consisting of a video tape, a magnetic tape, and a disk.

The present invention may best be understood through the following description with reference to the accompanying drawings, in which:

DETAILED DESCRIPTION OF THE PREFERRED EMBODIMENT

Figure 1:
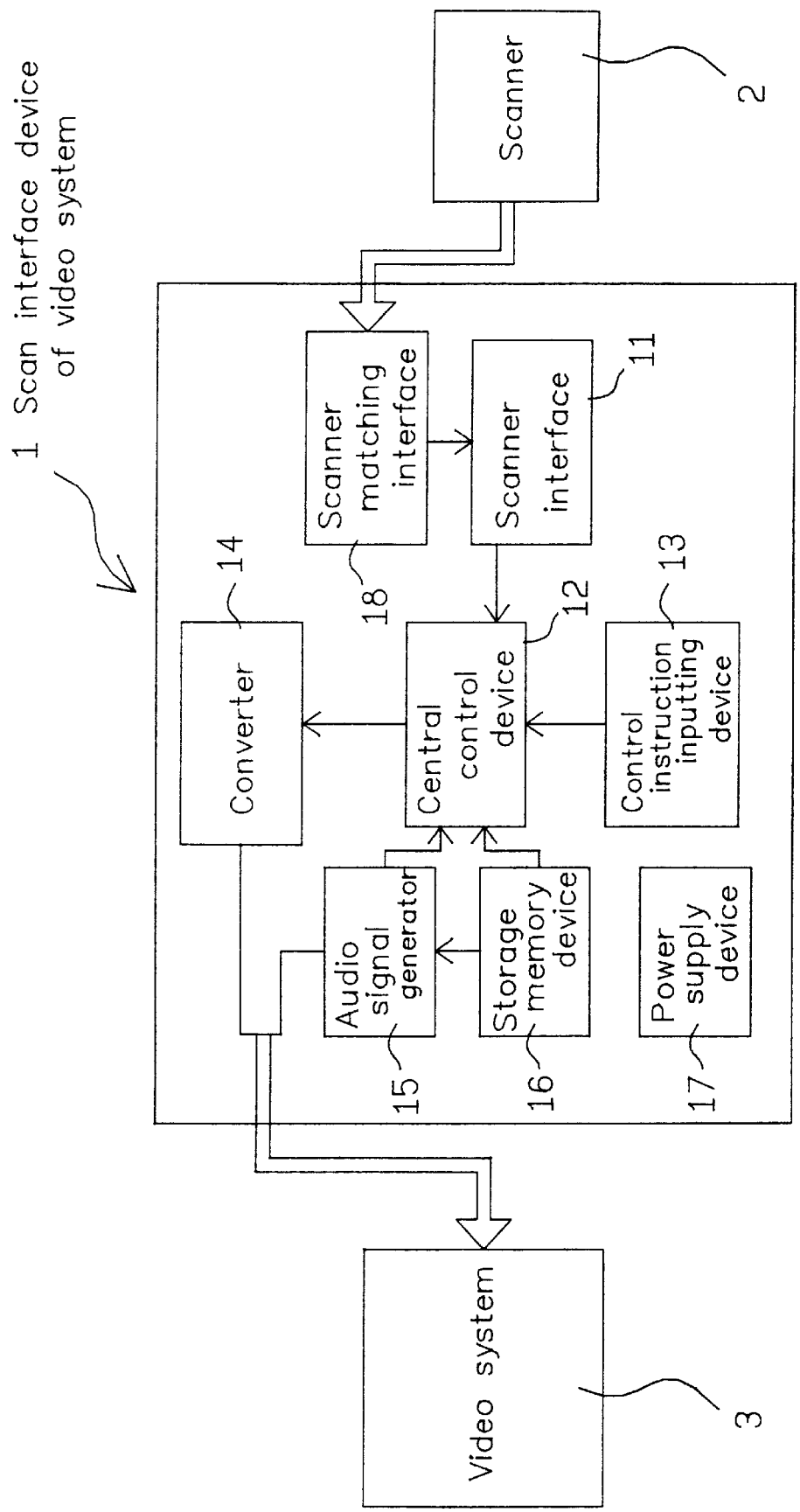
FIG. 1 is a schematic block diagram showing a preferred embodiment of a scanner interface device of video system according to the present invention.

As best seen in FIG. 1, there is shown the present scanner interface device of video system 1 connected to a scanner 2 and a video system 3. In the preferred embodiment, the present scanner interface device 1 includes a scanner interface 11, a central control device 12, a control instruction inputting device 13, a converter 14, an audio signal generator 15, a storage memory device 16, a power supply device 17, and a scanner matching interface 18 wherein the scanner matching interface 18 can be changed in type and number depending on the type and number of used scanners. For instance, when the present scanner interface device is connected to a single hand-held type or a sheet-feed type scanner, the scanner matching interface 18 is one used for a hand-held scanner or a sheet-feed scanner. If the present scanner interface device 1 is coupled with both types of scanners, both types of scanner matching interfaces 18 can be provided inside the present scanner interface device 1. Furthermore, other types of scanner matching interfaces can certainly be added to the present scanner interface device 1 to couple other types of scanners with the scanner interface device 1.

The present scanner interface device 1 operates in the following way: the data scanned by the scanner 2 is first received by the scanner interface device 1 and sent to the scanner matching interface 18 for facilitating an electrical communication between the scanner 2 and the scanner interface device 1. Then the data comes to the scanner interface 11 to be transformed into a preliminary video signal which then is conveyed to the converter 14 for being transformed into a secondary video signal complying with a specific video system format (e.g., NTSC, SECAM, PAL, or HDTV). A user can give all kinds of editing instructions (e.g., saving, numbering, or date marking) through the control instruction inputting device 13. The central control device 12 is configured to control actions taken place in the circuits inside the scanner interface device 1 and execute the editing action on the video signals according to the instruction given by the user. The audio signal generator 15 simulates an audio signal to enhance the visual and acoustic effects when the scanned data are presented on the video system 3 or stored at a video data storage media. The storage memory device 16 can be selected from ROM or RAM for storing therein the data of audio codes required for the simulated audio signal and the programming instruction needed by central control device 12. Finally, the power supply device 17 provides a required working power for the scanner interface device of video system.

The secondary video signals coupled with the audio signals generated by audio signal generator 15 are transmitted to the video system 3 for being presented or stored. The audio signal generator 15 enhances the visual and acoustic effects of the scanned data when presented or stored. The video system 3 is not limited to just one kind. More than one can be used with, such as a TV set, a VCR, or a personal computer. The video data storage media can be selected from a video tape, a magnetic tape, and a disk.

The present invention has the following advantages:
1. It is easy to operate and appropriate for use in families:
   A user is allowed to directly input editing instructions by means of the control instruction inputting device 13 just as the way one operates a function panel or a remote control of an electric appliance. Even one who does not know how to use computers can use a scanner.
2. It can be used more diversely:
   In addition to a computer, a scanner can be used with other kinds of video systems. For example, in a conference, the scanned data can be shown to the audience on a TV monitor.
3. It stores more data with less expense:
   Attributing to the fact that the present invention can be used with different kinds of video systems, the data storage media no longer have to be limited to magnetic tapes or disks but can be video tapes or the like which provides a more economic alternative. For instance, if each second of video tape can store therein one picture, then a 90-minute regular tape which is about 4 U.S. dollars can store therein 5400 pictures. Contrarily, a 1.44M or 1.2M magnetic tape which is about 70 cents cannot even store therein a picture of one second.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanner interface device of video system adapted to be used with a scanner scanning a scanned object to obtain a scanned signal comprising:
   a scanner interface receiving said scanned signal outputted by said scanner, transforming said scanned signal into a preliminary video signal, and outputting said preliminary video signal;
   a converter electrically connected to said scanner interface for receiving said preliminary video signal and directly transforming said preliminary video signal into a secondary video signal complying with a specific video system format; and
   a control unit electrically connected to said scanner interface and said converter for controlling said scanner interface device and executing an editing action on said preliminary video signal; wherein said video system format is one selected from a group consisting of NTSC (National Television System Committee), SEQAM (Sequence And Memory), PAL (Phase Alternation Line), and HDTV (High Definition TV).

2. A scanner interface device according to claim 1, further comprising a scanner-matching interface electrically connected to said scanner to secure an electrical match between said scanner interface of video system and said scanner.

3. A scanner interface device according to claim 1 wherein said converter is a video mixed signal generator.

4. A scanner interface device according to claim 1, wherein said control unit includes:
   a central control device electrically connected to said scanner interface and said converter to control said scanner interface device and execute said editing action;
   a control instruction inputting device electrically connected to said central control device through which a user can use a variety of control instructions to control said scanner interface; and
   a storage memory device electrically connected to said central control device for storing therein a variety of programming instructions that said central control device needs.

5. A scanner interface device of video system as claimed in claim 4, wherein said central control device is a central processing unit (C.P.U.).

6. A scanner interface device of video system as claimed in claim 1 further comprising an audio signal generator which is electrically connected to said control unit for producing a simulated audio signal.

7. A scanner interface device of video system as claimed in claim 6, further comprising a power supply device to provide a required working power for said scanner interface device of video system.

8. A scanner interface device of video system as claimed in claim 1 wherein said video data storage medium is one selected from a group consisting of a video tape, a magnetic tape, and a disk.

9. A scanner interface device of video system as claimed in claim 1 wherein said scanner-matching interface is one used for a hand-held scanner when said scanner is of a hand-held type.

10. A scanner interface device of video system as claimed in claim 1 wherein said scanner-matching interface is one used for a sheet-feed scanner when said scanner is of a sheet-feed type.

11. A scanner interface device of video system as claimed in claim 1 further comprising a storage memory device, selected from one of ROM and RAM, for storing programming instructions for said control unit.

12. A scanner interface device according to claim 1 wherein said secondary video signal is to be shown on a video system.

13. A scanner interface device of video system as claimed in claim 1 wherein said video system is one selected from a group consisting of a television and a VCR.

14. A scanner interface device according to claim 1 wherein said secondary video signal is to be stored in a video data storing medium.

* * * * *